United States Patent
Hsiao et al.

(10) Patent No.: US 11,682,965 B2
(45) Date of Patent: Jun. 20, 2023

(54) POWER SUPPLY WITH LIGHTNING PROTECTION

(71) Applicant: Chicony Power Technology Co., Ltd., New Taipei (TW)

(72) Inventors: Yung-Hung Hsiao, New Taipei (TW); Chia-Hsien Yen, New Taipei (TW); Cheng-Chang Hsiao, New Taipei (TW); Che-Han Li, New Taipei (TW); Yu-Xian Zeng, New Taipei (TW)

(73) Assignee: CHICONY POWER TECHNOLOGY CO., LTD, New Taipei (TW)

( * ) Notice: Subject to any disclaimer, the term of this patent is extended or adjusted under 35 U.S.C. 154(b) by 54 days.

(21) Appl. No.: 17/402,164

(22) Filed: Aug. 13, 2021

(65) Prior Publication Data

US 2022/0407309 A1     Dec. 22, 2022

(30) Foreign Application Priority Data

Jun. 21, 2021  (TW) .................................. 110122562

(51) Int. Cl.
*H02M 1/32*     (2007.01)
*H02H 9/04*     (2006.01)
(Continued)

(52) U.S. Cl.
CPC .............. *H02M 1/32* (2013.01); *H02H 7/125* (2013.01); *H02H 9/04* (2013.01); *H02M 7/219* (2013.01); *H02H 3/22* (2013.01); *H02M 1/4225* (2013.01)

(58) Field of Classification Search
CPC .... H02M 7/125; H02M 7/1623; H02M 7/162; H02M 7/217; H02M 7/219; H02M 1/32;
(Continued)

(56) References Cited

U.S. PATENT DOCUMENTS 6,055,167 A  *  4/2000  Shamkovich ....... H02M 1/4225
                                                363/54
8,503,199 B1 *  8/2013  Chapuis .............. H02M 1/0085
                                                363/21.06

(Continued)

FOREIGN PATENT DOCUMENTS

CN        201813599 U       4/2011
CN        202076941 U      12/2011
(Continued)

*Primary Examiner* — Alex Torres-Rivera
(74) *Attorney, Agent, or Firm* — Muncy, Geissler, Olds & Lowe, P.C

(57) ABSTRACT

A power supply with lightning protection includes a surge voltage suppression apparatus, an electromagnetic interference control circuit, a surge current bypass apparatus, an active bridge rectifier circuit, a power factor correction circuit, and a DC-to-DC conversion circuit. The surge voltage suppression apparatus is used to increase a tolerance of a surge voltage for the power supply. The electromagnetic interference control circuit is coupled to the surge voltage suppression apparatus. The surge current bypass apparatus is used to increase a tolerance of a surge current for the power supply. The active bridge rectifier circuit is used to rectify an input voltage. The power factor correction circuit is used to adjust the rectified input voltage to provide an adjusted input voltage on a bulk capacitor. The DC-to-DC conversion circuit is used to convert the adjusted input voltage into a DC output voltage.

11 Claims, 6 Drawing Sheets

(51) Int. Cl.
  *H02H 7/125* (2006.01)
  *H02M 7/219* (2006.01)
  *H02M 1/42* (2007.01)
  *H02H 3/22* (2006.01)

(58) Field of Classification Search
  CPC ...... H02M 1/325; H02M 1/4225; H02M 1/42; H02M 1/0085; H02H 3/22; H02H 1/04; H02H 7/125; H02H 7/1252; H02H 9/02; H02H 3/08; H02H 9/04
  See application file for complete search history.

(56) References Cited

U.S. PATENT DOCUMENTS

| | | |
|---|---|---|
| 9,490,694 B2 | 11/2016 | Alam |
| 2009/0230929 A1 | 9/2009 | Sui et al. |
| 2011/0164339 A1* | 7/2011 | Schmid ............... H02M 1/4208 361/18 |
| 2011/0260700 A1 | 10/2011 | Chen |
| 2012/0268084 A1 | 10/2012 | Wang et al. |
| 2012/0286663 A1 | 11/2012 | Puvanakijjakom et al. |
| 2013/0049709 A1* | 2/2013 | Fu ....................... H02M 1/0085 323/205 |
| 2013/0249397 A1 | 9/2013 | Chandran et al. |
| 2014/0125297 A1 | 5/2014 | Yin et al. |
| 2015/0138856 A1 | 5/2015 | Huynh et al. |
| 2015/0194807 A1* | 7/2015 | Wan ....................... H02M 1/32 361/119 |
| 2020/0373829 A1 | 11/2020 | Mouridsen et al. |
| 2022/0123648 A1* | 4/2022 | Xie ....................... H02M 1/32 |

FOREIGN PATENT DOCUMENTS

| | | |
|---|---|---|
| CN | 202077247 U | 12/2011 |
| CN | 109787203 A | 5/2019 |
| CN | 209593824 U | 11/2019 |
| CN | 212277921 U | 1/2021 |
| JP | 6186060 B1 | 8/2017 |
| TW | 1520459 B | 2/2016 |
| WO | 2010/111433 A2 | 9/2010 |
| WO | 2020/052617 A1 | 3/2020 |

* cited by examiner

POWER SUPPLY WITH LIGHTNING PROTECTION

BACKGROUND

Technical Field

The present disclosure relates to power supply, and more particularly to a power supply with lightning protection.

Description of Related Art

The statements in this section merely provide background information related to the present disclosure and do not necessarily constitute prior art.

The efficiency requirements of the power supply continue to improve, and the biggest turning point is the demand of Titanium. The focus of the design of the power factor correction (PFC) circuit will focus on reducing the loss of the full-wave rectifier. Currently, there are two common solutions: one is to connect each diode of the full-wave rectifier at the input end in parallel with a power switch (such as a MOSFET), and the other is to design the PFC as a bridgeless PFC. The common point of the two solutions is to reduce the conduction loss of the full-wave rectifier. However, no matter which solution is chosen, after deducting the components of the electromagnetic interference (EMI) control circuit, the connection with the input voltage will be the MOSFET, and therefore the tolerance of the lightning strike is much weaker than using diodes to achieve the full-wave rectifier.

As shown in FIG. 1, an active bridge power factor correction (PFC) is disclosed. The diodes $D_1$-$D_4$ are bypass diodes, and power switches $Q_1$-$Q_4$ are active bridge switches. When the lightning strike occurs (take a positive voltage and a positive half-cycle lightning strike as an example), the lightning strike enters from the live wire, one part of the lightning energy is absorbed by a varistor VAR (also known as a surge absorber), and the other part of the lightning energy enters the active bridge switches $Q_1$-$Q_4$ through the electromagnetic interference (EMI) control circuit. When the lightning voltage is a positive half cycle, the power switches Q1, Q4 are turned on, so the lightning strike will flow through a path formed by the power switch $Q_1$, a diode $D_5$, a bulk capacitor $C_{bulk}$, and the power switch $Q_4$. At this condition, power switches Q2, Q3 are turned off, and diodes D2, D3 are turned off due to reverse bias. Therefore, the surge voltage will directly cross between drains and sources of the power switches Q2, Q3, and the excessive surge voltage exceeds the rated voltage of the turned-off power switches Q2, Q3, thereby damaging the power switches Q2, Q3. Moreover, the excessive inrush current flows through the turned-on power switches Q1, Q4 to cause the junction temperature of the switches to be too high, thereby damaging the power switches Q1, Q4.

In addition, a negative voltage and a positive half-cycle lightning strike is shown in FIG. 2, that is, the lightning strike enters the power supply through a neutral wire. At this condition, the power switches Q1, Q4 are still turned on. However, since the lightning voltage enters the power supply through a path composed of an anti-parallel diode D3 of the power switch $Q_3$ and the power switch $Q_1$, it may cause the power switches Q1, Q3 to short-through and cause damage to the power switches Q1, Q3.

SUMMARY

An object of the present disclosure is to provide a power supply with lightning protection to solve the existing problems.

In order to achieve the above-mentioned object, the power supply with lightning protection includes a surge voltage suppression apparatus, an electromagnetic interference control circuit, a surge current bypass apparatus, an active bridge rectifier circuit, a power factor correction circuit, and a DC-to-DC conversion circuit. The surge voltage suppression apparatus increases a tolerance of a surge voltage for the power supply. The electromagnetic interference control circuit is coupled to the surge voltage suppression apparatus. The surge current bypass apparatus is coupled to the electromagnetic interference control circuit and increases a tolerance of a surge current for the power supply. The active bridge rectifier circuit is coupled to the surge current bypass apparatus and rectifies an input voltage. The power factor correction circuit is coupled to the active bridge rectifier circuit and adjusts the rectified input voltage to provide an adjusted input voltage on a bulk capacitor. The DC-to-DC conversion circuit is coupled to the power factor correction circuit and converts the adjusted input voltage into a DC output voltage.

In one embodiment, the surge voltage suppression apparatus includes a gas discharge tube and a varisor. The varisor is connected to the gas discharge tube in series and suppresses the surge voltage below a rated voltage.

In one embodiment, a clamped voltage provided the series-connected varistor and the gas discharge tube is less than a rated voltage that each of the power switches of the active bridge rectifier circuit withstands.

In one embodiment, the surge current bypass apparatus is coupled to the bulk capacitor, and the surge current bypass apparatus includes a first differential-mode inductor and a second differential-mode inductor. The first differential-mode inductor is coupled between the active bridge rectifier circuit and a live wire end of the input voltage. The second differential-mode inductor is coupled between the active bridge rectifier circuit and a neutral wire end of the input voltage.

In one embodiment, the first differential-mode inductor and the second differential-mode inductor are integrated into an inductor component.

In one embodiment, the surge current bypass apparatus further includes a first diode and a second diode, a third diode and a fourth diode. The second diode is connected to the first diode in series to form a first diode bridge arm, and the first diode bridge arm is coupled to the first differential-mode inductor. The fourth diode is connected to the third diode in series to form a second diode bridge arm, and the second diode bridge arm is coupled to the second differential-mode inductor.

In one embodiment, when the surge current flows through the power supply during a positive-half cycle of the input voltage, the first differential-mode inductor suppresses the surge current so that the surge current bypasses to the bulk capacitor through the first diode and the fourth diode.

In one embodiment, when the surge current flows through the power supply during a negative-half cycle of the input voltage, the second differential-mode inductor suppresses the surge current so that the surge current bypasses to the bulk capacitor through the third diode and the second diode.

In one embodiment, the power supply further includes a control circuit. The control circuit is coupled to the surge voltage suppression apparatus and receives an input current. The control circuit enables or disables the active bridge rectifier circuit according to the input current.

In one embodiment, the control circuit includes a current sensing circuit, a driver circuit, and a digital signal processor. The current sensing circuit receives the input current to generate a current notification signal. The driver circuit is coupled to the current sensing circuit and the active bridge rectifier circuit and receives the current notification signal. The digital signal processor is coupled to the current sensing circuit and the driver circuit and receives the current notification signal.

In one embodiment, when the input current is less than a current threshold value, the digital signal processor generates a pulse-width modulation signal to control the driver circuit according to the current notification signal so as to enable the active bridge rectifier circuit.

In one embodiment, when the input current is greater than or equal to a current threshold value, the digital signal processor stops generating a pulse-width modulation signal without controlling the driver circuit according to the current notification signal so as to disable the active bridge rectifier circuit.

In one embedment, when the input current is less than the current threshold value, the digital signal processor generates a response signal to the current sensing circuit so that the digital signal processor generates the pulse-width modulation signal to control the driver circuit according to the current notification signal so as to enable the active bridge rectifier circuit.

Accordingly, the power supply with lightning protection provides dual protection of lightning current and lightning voltage of power switches (MOSFETs) of the active bridge (rectifier) circuit.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
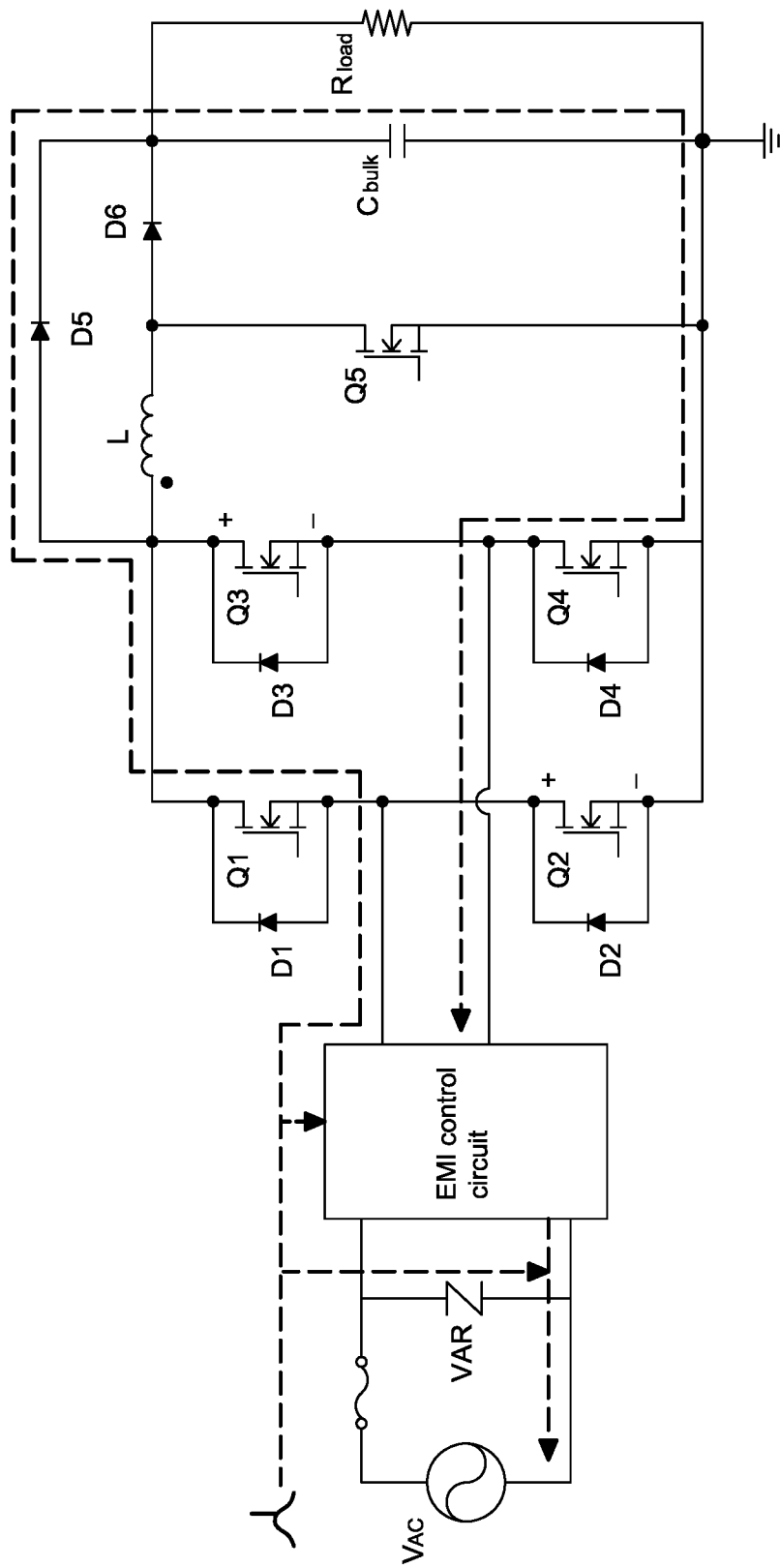
FIG. 1 is a block circuit diagram of affecting an active bridge power factor correction circuit by an external lightning strike in a first scenario of the related art.
Figure 2:
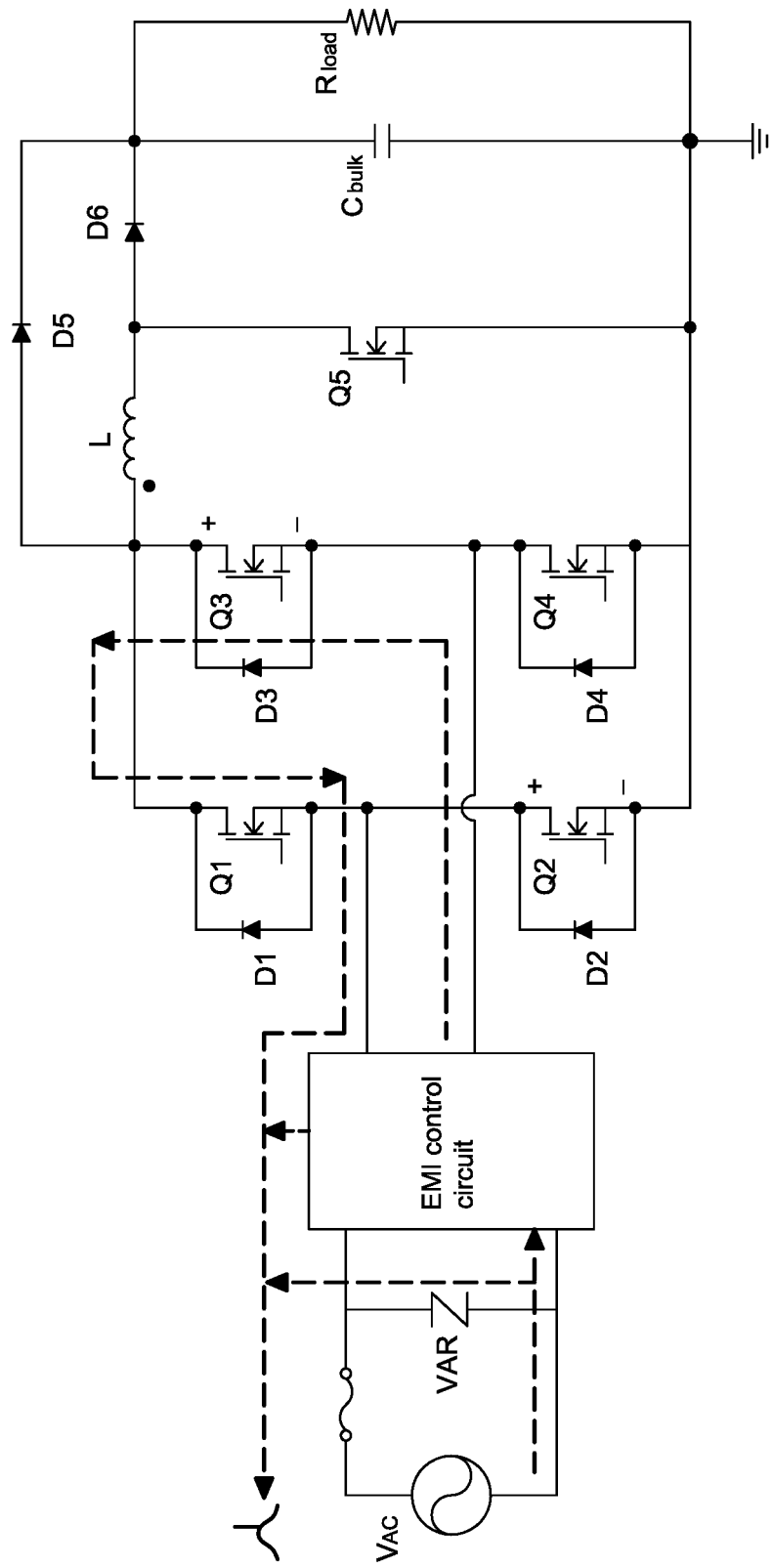
FIG. 2 is a block circuit diagram of affecting the active bridge power factor correction circuit by the external lightning strike in a second scenario of the related art.

Reference will now be made to the drawing figures to describe the present disclosure in detail. It will be understood that the drawing figures and exemplified embodiments of present disclosure are not limited to the details thereof.

Figure 3:
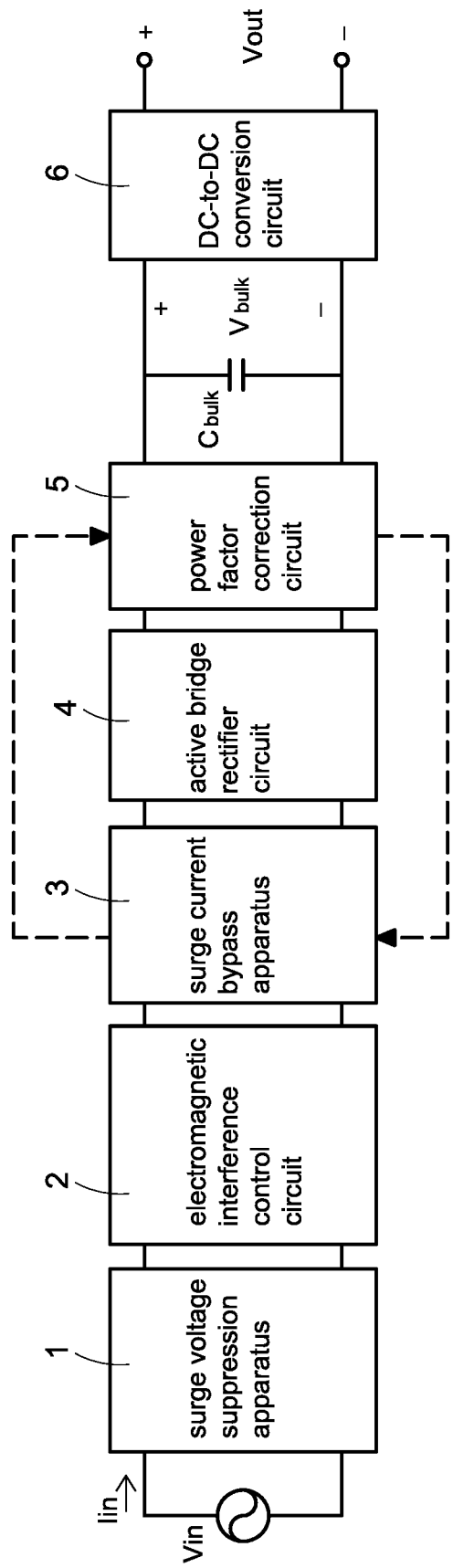
FIG. 3 is a block diagram of a power supply with lightning protection according to a first embodiment of the present disclosure.

Please refer to FIG. 3, which shows a block diagram of a power supply with lightning protection according to a first embodiment of the present disclosure. The power supply with lightning protection mainly includes a surge voltage suppression apparatus 1, an electromagnetic interference control circuit 2, a surge current bypass apparatus 3, an active bridge rectifier circuit 4, a power factor correction circuit 5, and a DC-to-DC conversion circuit 6.

An input side of the surge voltage suppression apparatus 1 receives an input voltage Vin, such as an AC input voltage, and the surge voltage suppression apparatus 1 is used to increase a surge voltage tolerance (a tolerance of a surge voltage) of the power supply. An input side of the electromagnetic interference control circuit 2 is coupled to an output side of the surge voltage suppression apparatus 1.

An input side of the surge current bypass apparatus 3 is coupled to an output side of the electromagnetic interference control circuit 2, and the surge current bypass apparatus 3 is used to increase a surge current tolerance (a tolerance of a surge current) of the power supply. An input side of the active bridge rectifier circuit 4 is coupled to an output side of the surge current bypass apparatus 3, and the active bridge rectifier circuit is used to rectify the input voltage Vin.

An input side of the power factor correction circuit 5 is coupled to an output side of the active bridge rectifier circuit 4, and the power factor correction circuit is used to adjust the rectified input voltage Vin to provide an adjusted input voltage $V_{bulk}$ on a bulk capacitor $C_{bulk}$. The bulk capacitor $C_{bulk}$ is a capacitor with a larger capacitance value to stabilize/regulate the adjusted input voltage $V_{bulk}$.

The DC-to-DC conversion circuit 6 is coupled to the power factor correction circuit 5, and the DC-to-DC conversion circuit 6 is used to convert the adjusted input voltage $V_{bulk}$ into a DC output voltage Vout. For example, the DC-to-DC conversion circuit 6 is used to convert (step up or step down) a DC voltage magnitude of the adjusted input voltage $V_{bulk}$ to meet the voltage level required by a load connected to the power supply.

Figure 4:
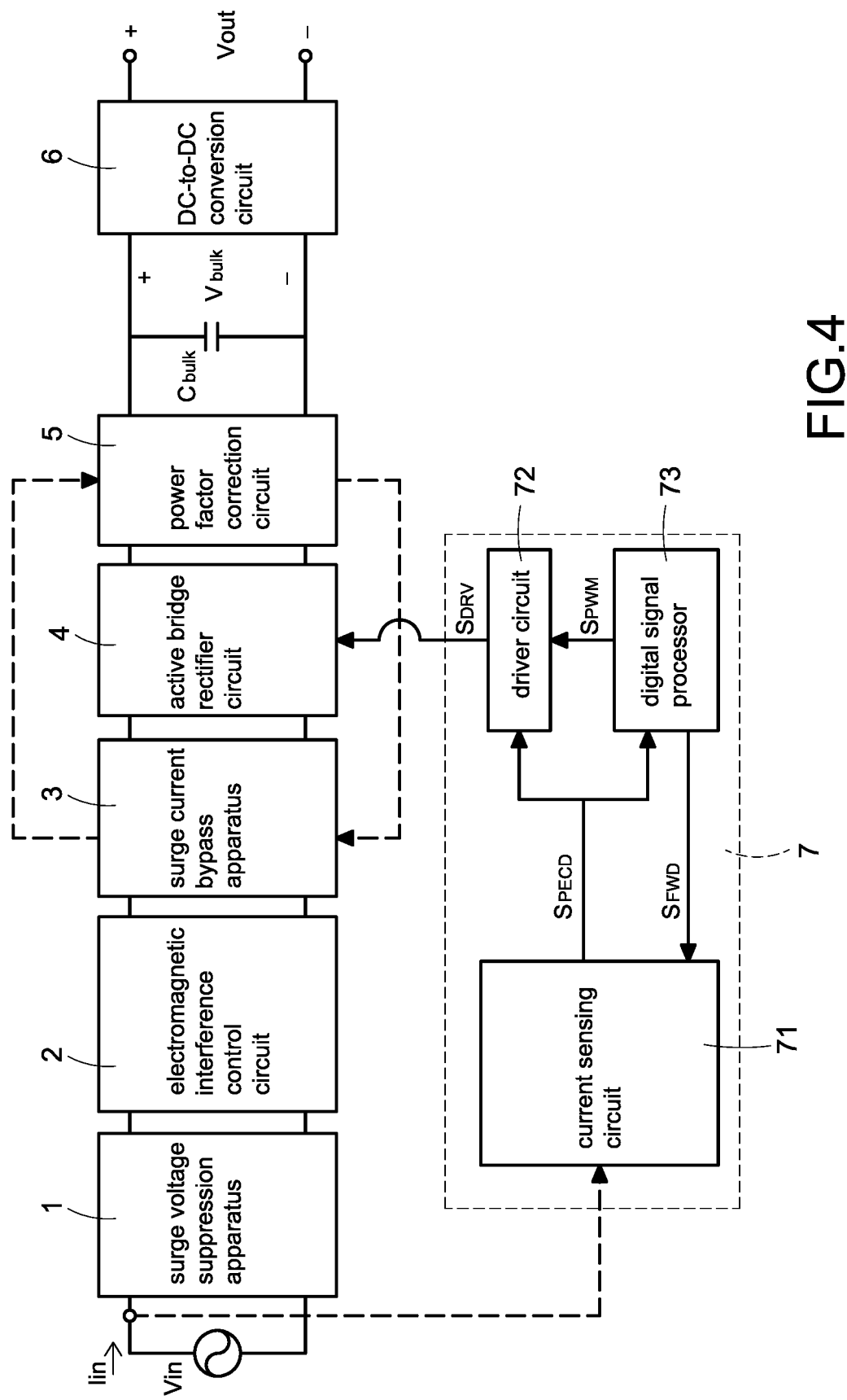
FIG. 4 is a block diagram of the power supply with lightning protection according to a second embodiment of the present disclosure.

Please refer to FIG. 4, which shows a block diagram of the power supply with lightning protection according to a second embodiment of the present disclosure. The power supply with lightning protection further includes a control circuit 7. An input end of the control circuit 7 is coupled to an input end of the surge voltage suppression apparatus 1 and receives an input current Iin (more details later), and an output end of the control circuit 7 is coupled to the active bridge rectifier circuit 4. Therefore, the control circuit 7 enables or disables the active bridge rectifier circuit 4 according to the input current Iin to control rectifying the input voltage Vin. The operation of the control circuit 7 is described in detail later.

Figure 5:
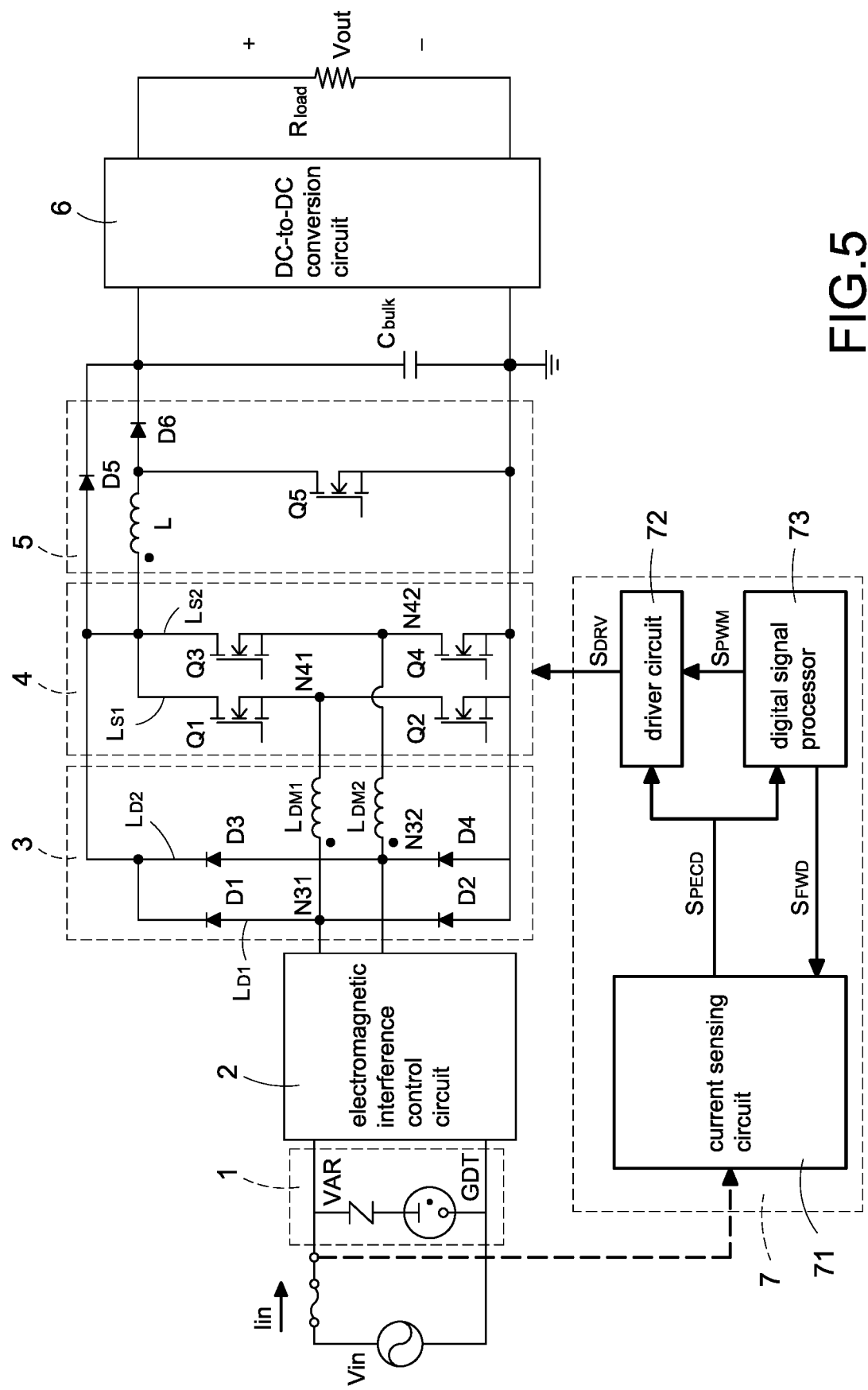
FIG. 5 is a block circuit diagram of the power supply with lightning protection according to the second embodiment of the present disclosure.

Please refer to FIG. 5, which shows a block circuit diagram of the power supply with lightning protection according to the second embodiment of the present disclosure, and also refer to FIG. 4. The surge voltage suppression apparatus 1 includes a gas discharge tube GDT and a varistor VAR. The varistor VAR is connected to the gas discharge tube GDT in series to suppress the surge voltage below a rated voltage.

In one embodiment, the surge current bypass apparatus 3 is coupled to the bulk capacitor $C_{bulk}$, and the surge current bypass apparatus 3 includes two diode bridge arms and a differential-mode inductor component $L_{DM}$. The two diode bridge arms include a first diode bridge arm $L_{D1}$ and a second diode bridge arm $L_{D2}$. The first diode bridge arm $L_{D1}$ includes a first diode $D_1$ and a second diode $D_2$ connected in series at a node $N_{31}$. The second diode bridge arm $L_{D2}$ includes a third diode $D_3$ and a fourth diode $D_4$ connected in series at a node $N_{32}$.

The differential-mode inductor component $L_{DM}$ includes a first differential-mode inductor $L_{DM1}$ and a second differential-mode inductor $L_{DM2}$. The first differential-mode inductor $L_{DM1}$ is coupled between the active bridge rectifier circuit 4 and a live wire end of the input voltage Vin. The second differential-mode inductor $L_{DM2}$ is coupled between the active bridge rectifier circuit 4 and a neutral wire end of the input voltage Vin. Specifically, a first end of the first differential-mode inductor $L_{DM1}$ is connected to the node $N_{31}$ commonly connected to the first diode $D_1$ and the second diode $D_2$, and a second end of the first differential-mode inductor $L_{DM1}$ is connected to a node $N_{41}$ commonly connected to a first switch $Q_1$ and a second switch $Q_2$. A first end of the second differential-mode inductor $L_{DM2}$ is connected to the node $N_{32}$ commonly connected to the third diode $D_3$ and the fourth diode $D_4$, and a second end of the second differential-mode inductor $L_{DM2}$ is connected to a node $N_{42}$ commonly connected to a third switch $Q_3$ and a fourth switch $Q_4$. In one embodiment, the differential-mode inductor component $L_{DM}$, i.e., the first differential-mode inductor $L_{DM1}$ and the second differential-mode inductor $L_{DM2}$ are integrated into an inductor component.

In one embodiment, the active bridge rectifier circuit 4 includes two parallel-connected switch bridge arms, including a first switch bridge arm $L_{S1}$ and a second switch bridge arm $L_{S2}$. The first switch bridge arm $L_{S1}$ includes the first switch $Q_1$ and the second switch $Q_2$ connected in series at the node $N_{41}$. The second switch bridge arm $L_{S2}$ includes the third switch $Q_3$ and the fourth switch $Q_4$ connected in series at the node $N_{42}$.

When the surge current flows through the power supply during a positive-half cycle of the input voltage Vin, the input current $I_{IN}$ is greater than or equal to a current threshold value $I_{TH}$, and therefore the first differential-mode inductor $L_{DM1}$ suppresses the surge current so that the surge current bypasses to the bulk capacitor $C_{bulk}$ through the first diode $D_1$ and the fourth diode $D_4$, that is, the energy generated by the surge current is bypassed to the bulk capacitor $C_{bulk}$ and absorbed by the bulk capacitor $C_{bulk}$.

When the surge current flows through the power supply during a negative-half cycle of the input voltage Vin, the input current $I_{IN}$ is greater than or equal to a current threshold value $I_{TH}$, and therefore the second differential-mode inductor $L_{DM2}$ suppresses the surge current so that the surge current bypasses to the bulk capacitor $C_{bulk}$ through the third diode $D_3$ and the second diode $D_2$, that is, the energy generated by the surge current is bypassed to the bulk capacitor $C_{bulk}$ and absorbed by the bulk capacitor $C_{bulk}$.

Specifically, when the lightning strike occurs (take a positive voltage and a positive half-cycle lightning strike as an example), one part of the lightning energy is absorbed by the series-connected varistor VAR and gas discharge tube GDT, and the other part of the lightning energy enters the surge current bypass apparatus 3 through the electromagnetic interference control circuit 2. At this condition, since the lightning current is a high-frequency electrical quantity, the first differential-mode inductor $L_{DM1}$ and the second differential-mode inductor $L_{DM2}$ of the surge current bypass apparatus 3 may be regarded as high-impedance components, and therefore the lightning current fails to flow through the first differential-mode inductor $L_{DM1}$ and the second differential-mode inductor $L_{DM2}$ (under ideal conditions). Instead, the lightning current flows through a low-impedance path composed of the first diode $D_1$, a diode $D_5$, and the bulk capacitor $C_{bulk}$ so that this part of lightning energy is absorbed by the bulk capacitor $C_{bulk}$. That is, the lightning current flows to the bulk capacitor $C_{bulk}$ through a bypass path provided by the first diode $D_1$ and the diode $D_5$. Therefore, the bypassed lightning current does not flow through the four switches $Q_1$-$Q_4$ of the active bridge rectifier circuit 4 so that the protection of the four switches $Q_1$-$Q_4$ can be provided.

In particular, if only the varistor VAR is used, when the lightning strike occurs, the voltage clamped by the varistor VAR is quite large, for example, may be more than 600 volts. In other words, even if the varistor VAR achieves the function of clamping the lightning voltage, the clamped voltage (that is, 600 volts) is still sufficient to damage the four power switches $Q_1$-$Q_4$ (such as MOSFETs). Specifically, when the input voltage Vin is between 90 and 264 volts, the varistor VAR does not need to work.

Therefore, the series-connected gas discharge tube GDT is required. At this condition, the gas discharge tube GDT may be regarded as a switch. In other words, once the varistor VAR is used in series with the gas discharge tube GDT, the varistor VAR with a lower withstand voltage (clamped voltage) may be used. Therefore, when the lightning strike occurs and the voltage clamped by the varistor VAR can be reduced to below the rated voltage that the MOSFET can withstand (depending on the withstand voltage of the used varistor VAR), both clamping the lightning voltage and protecting the four switches $Q_1$-$Q_4$ can be achieved. That is, the four switches $Q_1$-$Q_4$ will not be damaged due to the excessively high clamped voltage.

For example, it is assumed that the rated voltage that each of the four switches $Q_1$-$Q_4$ can withstand is 600 volts. If only the varistor VAR is used for clamping the lightning voltage, the clamped voltage will be greater than 600 volts (such as 900 volts) when the lightning voltage is 1200 volts and the varistor VAR will not work under the input voltage is between 90 and 264 volts, therefore, it is not possible to provide protection to the four switches $Q_1$-$Q_4$.

Therefore, when the series-connected varistor VAR and gas discharge tube GDT are used and under the same condition (i.e., the lightning voltage is 1200 volts and the varistor VAR will not work under the input voltage is between 90 and 264 volts), the varistor VAR with a lower clamped voltage (for example, 400 volts) may be used, and the gas discharge tube GDT with a minimum breakdown voltage of 200 volts can be used. When the input voltage Vin normally supplies power under 90 to 264 volts, the series-connected varistor VAR and gas discharge tube GDT will not work. Once the 1200-volt lightning voltage occurs, the gas discharge tube GDT will be instantly turned on, thereby both making the varistor VAR clamp the lightning voltage to 400 volts and protecting the four switches $Q_1$-$Q_4$ since each of the four switches $Q_1$-$Q_4$ can withstand is 600 volts.

As mentioned above, and refer to FIG. 5. The control circuit 7 includes a current sensing circuit 71, a driver circuit 72, and a digital signal processor 73. The current sensing circuit 71 receives the input current Iin, and generates a current notification signal $S_{PECD}$ according to the input current Iin. The driver circuit 72 is coupled to the current sensing circuit 71 and the active bridge rectifier circuit 4, and receives the current notification signal $S_{PECD}$. The digital signal processor 73 is coupled to the current sensing circuit 71 and the driver circuit 72, and receives the current notification signal $S_{PECD}$.

Figure 6:
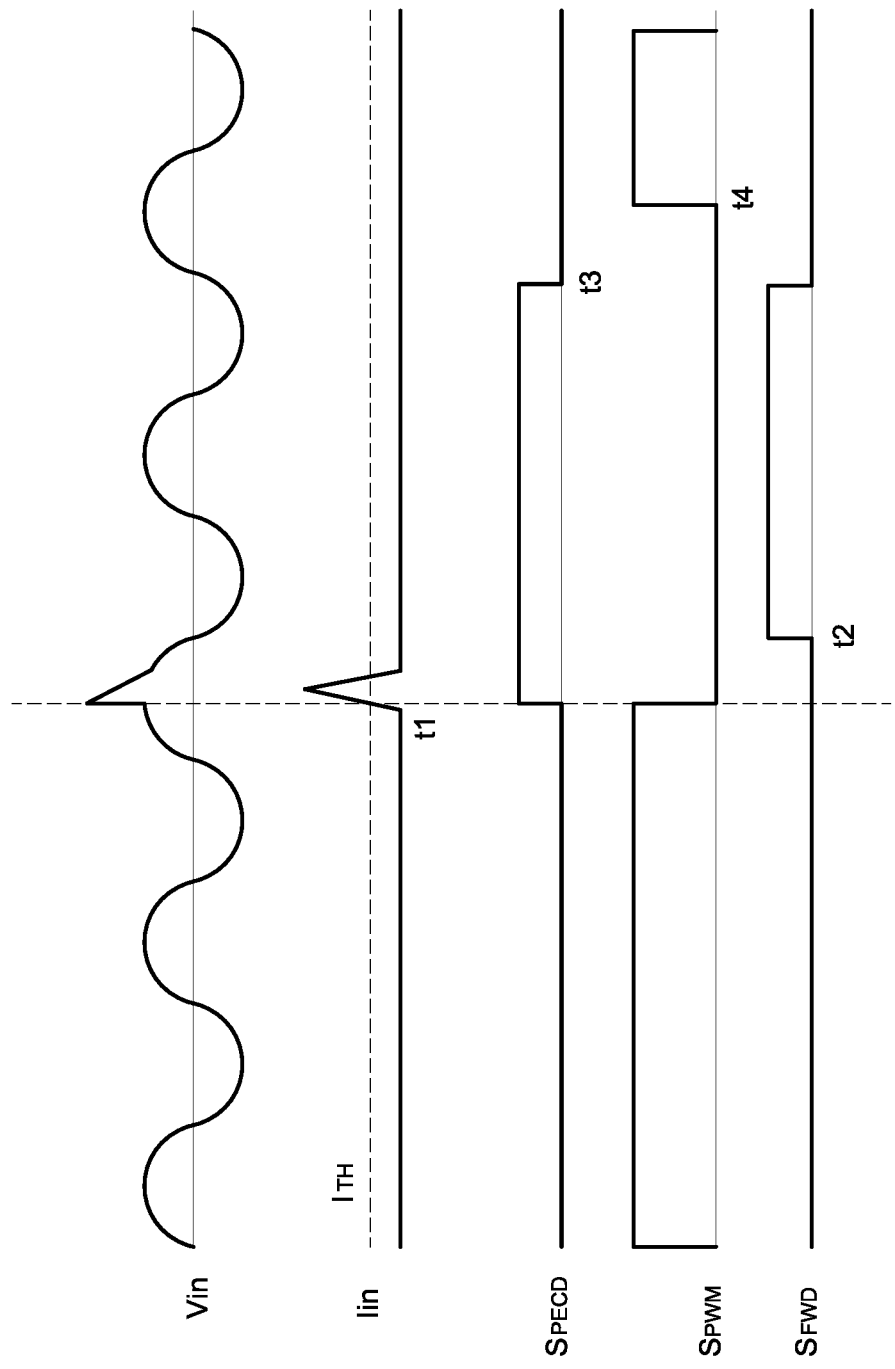
FIG. 6 is schematic waveforms provided from a control circuit according to the present disclosure.

Please refer to FIG. 6, which shows schematic waveforms provided from a control circuit according to the present disclosure. When the input current Iin is less than the current threshold value $I_{TH}$, the digital signal processor 73 generates a pulse-width modulation signal $S_{PWM}$ according to the current notification signal $S_{PECD}$ to control the driver circuit 72 so as to enable the active bridge rectifier circuit 4. On the contrary, when the input current Iin is greater than or equal to the current threshold value $I_{TH}$, the digital signal processor 73 stops generating the pulse-width modulation signal $S_{PWM}$ according to the current notification signal $S_{PECD}$ without controlling the driver circuit 72 so as to disable the active bridge rectifier circuit 4.

For example, when the lightning strike occurs, the current sensing circuit 71 determines a lightning current (also referred to as an inrush current or a surge current) according to a magnitude of the sampled (received) input current $I_{IN}$. At this condition, a driver signal $S_{DRV}$ generated by the control circuit 7 does not drive the switches $Q_1$-$Q_4$ of the active bridge rectifier circuit 4. Alternatively, the control circuit 7 does not generate the driver signal $S_{DRV}$ so that the first switch $Q_1$ to the fourth switch $Q_4$ are not driven. At this condition, one part of the energy generated by the lightning strike will be absorbed by the varistor VAR and the gas discharge tube GDT of the surge voltage suppression apparatus 1, and the other part of the energy generated by the lightning strike will be absorbed by the bulk capacitor $C_{bulk}$ through a bypass path provided by the diodes $D_1$-$D_4$ so that the duplicate protection of the first switch $Q_1$ to the fourth switch $Q_4$ is achieved.

Specifically, as shown in FIG. 6, when the lightning strike occurs at time t1, the input current Iin will significantly increase. Therefore, when the current sensing circuit 71 detects and determines that the received input current Iin is greater than the current threshold value $I_{TH}$, it is determined that the lightning strike has occurred. The current sensing circuit 71 generates the current notification signal $S_{PECD}$ or outputs the current notification signal $S_{PECD}$ with a specific level (for example, a high level) to the driver circuit 72 and the digital signal processor 73. At this condition, since the digital signal processor 73 realizes that the lightning strike has occurred according to the current notification signal $S_{PECD}$, the pulse-width modulation signal $S_{PWM}$ is transited from an enabled level (such as a high level) to a disabled level (such as a low level) or the pulse-width modulation signal $S_{PWM}$ is stopped generating so that the driver circuit 72 is not controlled to disable the first switch $Q_1$ to the fourth switch $Q_4$ of the active bridge rectifier circuit 4.

In particular, since the lightning current occurs for a very short time, the digital signal processor 73 cannot accurately receive the information about the lightning current. If the driver signal $S_{DRV}$ that provides to stop driving the first switch $Q_1$ to the fourth switch $Q_4$ is not latched, once the instantaneous lightning energy passes, the driver signal $S_{DRV}$ will be enabled to drive the first switch $Q_1$ to the fourth switch $Q_4$ again. Therefore, the accumulated lightning energy would cause damage to the first switch to the first switch $Q_1$ to the fourth switch $Q_4$, and loses the protection function. In other words, when the lightning current occurs, the driver signal $S_{DRV}$ needs to be latched to make the first switch $Q_1$ to the fourth switch $Q_4$ be not continuously driven. As shown in FIG. 6, the current notification signal $S_{PECD}$ continuously maintains at a high level to notify the driver circuit 72 and the digital signal processor 73 that the first switch $Q_1$ to the fourth switch $Q_4$ should be stopped driving at present.

When the lightning strike occurs for a period of time, since the input voltage Vin returns to a stable sinusoidal wave, that is, the power supply returns to normal, the input current Iin also drops below the current threshold value $I_{TH}$. When the digital signal processor 73 determines that the input current Iin drops below the current threshold value $I_{TH}$ (that is, the lightning strike occurs for a period of time), the digital signal processor 73 outputs a response signal $S_{FWD}$ with a specific level (for example, a high level) at a time t2 shown in FIG. 6 to the current sensing circuit 71. Therefore, the current sensing circuit 71 stops generating the current notification signal $S_{PECD}$ or outputs the current notification signal $S_{PECD}$ with a specific level (for example, a low level) at a time t3 to the driver circuit 72 and the digital signal processor 73. At this condition, the digital signal processor 73 can simultaneously transit the response signal $S_{FWD}$ to a low level before a time t3 or at the time t3. Therefore, the digital signal processor 73 realizes that the lightning strike occurs for a period of time according to the low-level current notification signal $S_{PECD}$, and the pulse-width modulation signal $S_{PWM}$ is transited from disabled level (such as a low level) to the enabled level (such as a high level) or the pulse-width modulation signal $S_{PWM}$ starts to be generated at a time t4 so that the driver circuit 72 is controlled to enable the first switch $Q_1$ to the fourth switch $Q_4$ of the active bridge rectifier circuit 4.

In summary, the power supply with lightning protection of the present disclosure provides duplicate protection of lightning current and lightning voltage for power switches (MOSFETs) of the active bridge rectifier circuit.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply with lightning protection, comprising:
   a surge voltage suppression apparatus, configured to increase a tolerance of a surge voltage for the power supply,
   an electromagnetic interference control circuit, coupled to the surge voltage suppression apparatus,
   a surge current bypass apparatus, coupled to the electromagnetic interference control circuit and configured to increase a tolerance of a surge current for the power supply,
   an active bridge rectifier circuit, coupled to the surge current bypass apparatus and configured to rectify an input voltage,
   a power factor correction circuit, coupled to the active bridge rectifier circuit and configured to adjust the rectified input voltage to provide an adjusted input voltage on a bulk capacitor,
   a DC-to-DC conversion circuit, coupled to the power factor correction circuit and configured to convert the adjusted input voltage into a DC output voltage, and
   a control circuit, coupled to the surge voltage suppression apparatus, and the control circuit comprising:
      a current sensing circuit, configured to receive an input current to generate a current notification signal,
      a driver circuit, coupled to the current sensing circuit and the active bridge rectifier circuit and configured to receive the current notification signal, and
      a digital signal processor, coupled to the current sensing circuit and the driver circuit and configured to receive the current notification signal,
   wherein the control circuit enables or disables the active bridge rectifier circuit according to the input current.

2. The power supply as claimed in claim 1, wherein the surge voltage suppression apparatus comprises:

a gas discharge tube, and a varisor, connected to the gas discharge tube in series and configured to suppress the surge voltage below a rated voltage.

3. The power supply as claimed in claim 2, wherein a clamped voltage provided the series-connected varistor and the gas discharge tube is less than a rated voltage that each of the power switches of the active bridge rectifier circuit withstands.

4. The power supply as claimed in claim 1, wherein the surge current bypass apparatus is coupled to the bulk capacitor, and the surge current bypass apparatus comprises:

a first differential-mode inductor, coupled between the active bridge rectifier circuit and a live wire end of the input voltage, and a second differential-mode inductor, coupled between the active bridge rectifier circuit and a neutral wire end of the input voltage.

5. The power supply as claimed in claim 4, wherein the first differential-mode inductor and the second differential-mode inductor are integrated into an inductor component.

6. The power supply as claimed in claim 4, wherein the surge current bypass apparatus further comprises:

a first diode, and a second diode, connected to the first diode in series to form a first diode bridge arm, and the first diode bridge arm coupled to the first differential-mode inductor, a third diode, and a fourth diode, connected to the third diode in series to form a second diode bridge arm, and the second diode bridge arm coupled to the second differential-mode inductor.

7. The power supply as claimed in claim 6, wherein when the surge current flows through the power supply during a positive-half cycle of the input voltage, the first differential-mode inductor suppresses the surge current so that the surge current bypasses to the bulk capacitor through the first diode and the fourth diode.

8. The power supply as claimed in claim 6, wherein when the surge current flows through the power supply during a negative-half cycle of the input voltage, the second differential-mode inductor suppresses the surge current so that the surge current bypasses to the bulk capacitor through the third diode and the second diode.

9. The power supply as claimed in claim 1, wherein when the input current is less than a current threshold value, the digital signal processor generates a pulse-width modulation signal to control the driver circuit according to the current notification signal so as to enable the active bridge rectifier circuit.

10. The power supply as claimed in claim 1, wherein when the input current is greater than or equal to a current threshold value, the digital signal processor stops generating a pulse-width modulation signal without controlling the driver circuit according to the current notification signal so as to disable the active bridge rectifier circuit.

11. The power supply as claimed in claim 10, wherein when the input current is less than the current threshold value, the digital signal processor generates a response signal to the current sensing circuit so that the digital signal processor generates the pulse-width modulation signal to control the driver circuit according to the current notification signal so as to enable the active bridge rectifier circuit.

* * * * *